United States Patent [19]
Chiang et al.

[11] Patent Number: 5,946,498
[45] Date of Patent: Aug. 31, 1999

[54] DELIVERY OF CLIENT REMOTE PROCEDURE CALLS TO A SERVER VIA A REQUEST QUEUE UTILIZING PRIORITY AND TIME-OUT

[75] Inventors: Redem Ky Chiang, Saratoga; Paul Kai-Wan Lee, San Jose; Hai P. Nguyen, San Jose; Jwu-Shyan Tarng, San Jose, all of Calif.

[73] Assignee: International Business Machines Corporation, Armonk, N.Y.

[21] Appl. No.: 08/747,727

[22] Filed: Nov. 12, 1996

[51] Int. Cl.⁶ ...................................................... G06F 13/14
[52] U.S. Cl. .................... 395/874; 395/200.37; 395/292; 395/859; 395/860; 395/874
[58] Field of Search ............................... 395/292, 185.08, 395/185.09, 736, 737, 673, 874, 859, 860, 861, 732, 684, 200.33, 200.37, 200.36, 200.7, 200.49, 672; 371/37.6

[56] References Cited

U.S. PATENT DOCUMENTS

| | | | |
|---|---|---|---|
| 4,045,661 | 8/1977 | Antoine et al. | 395/182.15 |
| 4,464,751 | 8/1984 | Stranko et al. | 395/183.21 |
| 5,153,881 | 10/1992 | Bruckert et al. | 395/182.08 |
| 5,315,600 | 5/1994 | Iwamura et al. | 371/37.6 |
| 5,333,319 | 7/1994 | Silen | 395/673 |
| 5,371,742 | 12/1994 | Brown et al. | 395/181 |
| 5,535,322 | 7/1996 | Hecht | 705/1 |
| 5,544,318 | 8/1996 | Schmitz et al. | 395/200.37 |
| 5,570,411 | 10/1996 | Sicher | 455/450 |
| 5,642,515 | 6/1997 | Jones et al. | 395/727 |
| 5,671,446 | 9/1997 | Rakity et al. | 395/874 |
| 5,678,007 | 10/1997 | Hurvig | 395/200.57 |
| 5,687,390 | 11/1997 | McMillan, Jr. | 395/825 |
| 5,699,523 | 12/1997 | Li et al. | 395/200.68 |
| 5,737,547 | 4/1998 | Zuravleff et al. | 395/292 |
| 5,758,087 | 5/1998 | Aaker et al. | 395/200.62 |
| 5,761,507 | 6/1998 | Govett | 395/200.49 |
| 5,787,281 | 7/1998 | Schreiber et al. | 395/684 |

*Primary Examiner*—Frank J. Asta
*Assistant Examiner*—William C. Vaughn, Jr.

[57] ABSTRACT

A computer system includes at least a server procedure and a client processor. The client processor includes plural applications which issue requests for execution of server procedures. A queue is present in the client processor and lists the requests. The client processor also includes plural input/output procedures which enable dispatch of requests to the server procedure. The client processor operates in conjunction with the I/O procedures, removes a request from the queue, and dispatches the request to the server procedure. The processor responds to occurrence of a time-out, with no response being received from the server procedure, to place the current request at the beginning of the queue so as to enable the I/O procedure to service a further request from the queue. The I/O procedure of the client processor handles requests from the queue, based upon assigned priority levels, and removes from the queue a highest assigned priority request that is closest to the end of the queue, before removing a lower priority request.

15 Claims, 3 Drawing Sheets

DELIVERY OF CLIENT REMOTE PROCEDURE CALLS TO A SERVER VIA A REQUEST QUEUE UTILIZING PRIORITY AND TIME-OUT

FIELD OF THE INVENTION

This invention is directed generally to the handling of remote procedure calls that are issued from a client processor to a server processor and, more particularly, the invention addresses how such remote procedure calls can be handled in an efficient manner by a limited number of input-output procedures.

BACKGROUND OF THE INVENTION

The Network File System (NFS) is a widely used protocol for reading and writing of remotely located files. Such remote actions employ a "remote procedure call" (RPC) which is embodied in a message to the remote processor and enables the establishment of a communication session whereby the requested data can either be read or written. When a processor executes one or more applications which require access to a file in a remote processor, an RPC is issued. A processor issuing the RPC is called the client and the processor to which the RPC is directed is called the server.

In the client processor, a number of input/output (I/O) procedures are present which are established to handle the dispatch of RPCs and the receipt of reply messages from the server processor. The client processor includes a limited number of such I/O procedures and they are often referred to as I/O daemons. A daemon is a procedure which, once started, continues until an action is taken to positively cause it to cease. Client processors include a finite number of I/O daemons which handle all read/write RPCs.

Under certain implementations of the NFS protocol, if the remote server does not reply within a predefined time interval (i.e. after an RPC time-out), the I/O daemon retransmits the same RPC message to the server. If the remote server is not available or has failed, the I/O daemon will continue sending out the same RPC message every time an RPC time-out occurs. As a result, the I/O daemon can be occupied the with same RPC request for a long period of time, while the number of queued requests yet to be handled, builds up.

More specifically, a client processor generally queues RPC requests in a first-in/first-out queue, without any priority consideration. The queue is generally configured as a linked list. When a daemon is free, it checks the linked list and accesses the RPC request that was first inserted into the linked list. This same action occurs for other I/O daemons. However, if all daemons happen to be handling RPCs for low priority procedures, and the server to which the RPCs are directed is either out of service or is otherwise unavailable, other RPC requests positioned higher in the linked list are blocked and do not get dispatched. All of the occupied I/O daemons continue churning out retries and the entire system becomes non-functional.

Accordingly, it is an object of this invention to provide a method and apparatus for the handling of RPCs wherein the unavailability of a server does not prevent the dispatch of other queued RPCs.

It is another object of this invention to provide an improved method and apparatus for enabling dispatch of RPCs to a server procedure, wherein priority considerations are taken into account during the dispatch function.

It is yet another object of this invention to provide an improved method and apparatus for dispatch of RPCs to remote server(s) wherein an I/O daemon is enabled to move to another RPC in a queue, if a current RPC cannot be successfully dispatched to a server.

SUMMARY OF THE INVENTION

A computer system includes at least a server procedure and a client processor. The client processor includes plural applications which issue requests for execution of server procedures. A queue is present in the client processor and lists the requests. The client processor also includes plural input/output procedures which enable dispatch of requests to the server procedure. The client processor operates in conjunction with the I/O procedures, removes a request from the queue, and dispatches the request to the server procedure. The processor responds to occurrence of a time-out, with no response being received from the server procedure, to place the current request at the beginning of the queue so as to enable the I/O procedure to service a further request from the queue. The I/O procedure of the client processor handles requests from the queue, based upon assigned priority levels, and removes from the queue a highest assigned priority request that is closest to the end of the queue, before removing a lower priority request.

DETAILED DESCRIPTION OF THE INVENTION

Figure 1:
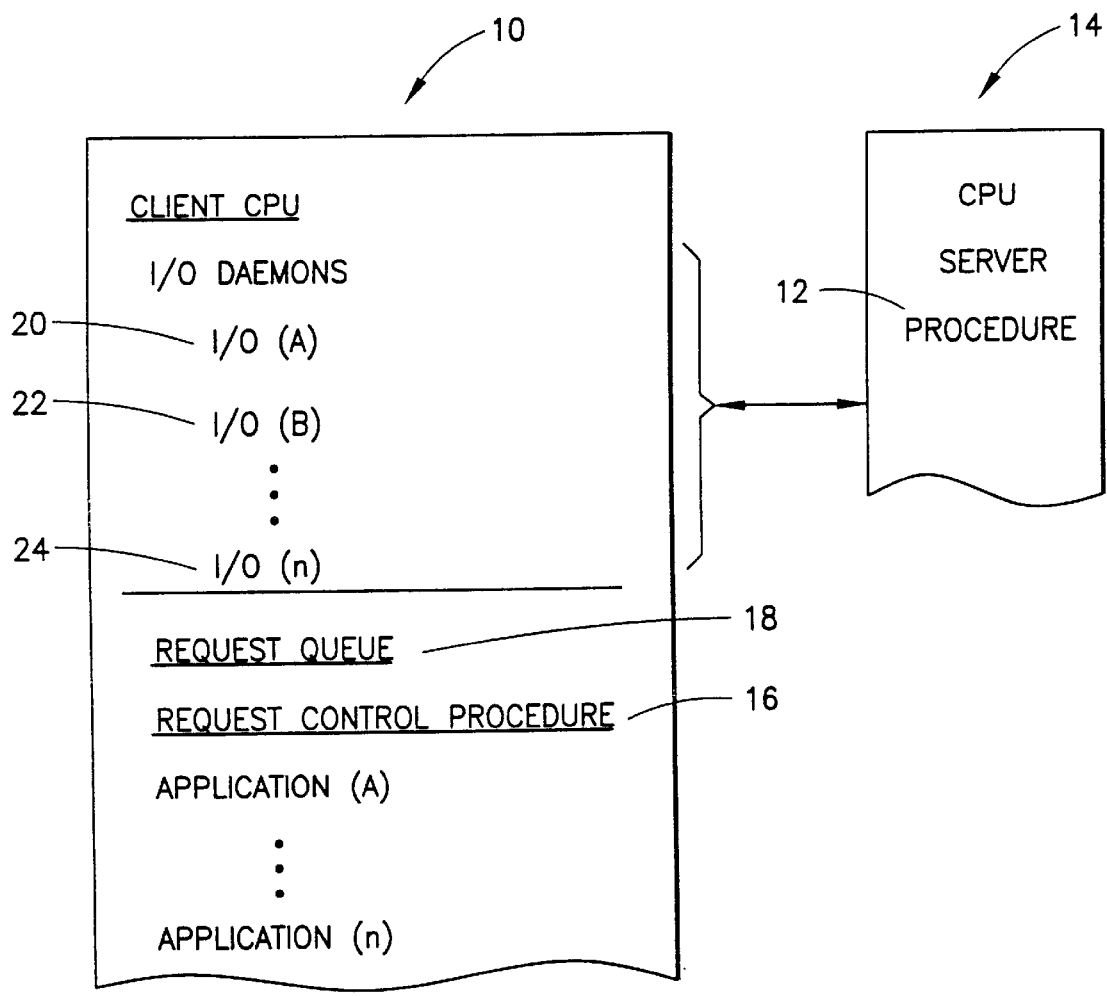
FIG. 1 is a schematic illustrating client and server central processing units which embody the invention hereof.

Referring to FIG. 1, a client central processing unit (CPU) 10 includes a number of executing applications A-n. During execution, an application will often generate a requirement for a read or write action in a server procedure 12 that is resident in a remote CPU 14. In such case, client CPU 10 executes a request control procedure 16 which lists the read-write request on a request queue 18. If client CPU 10 is operating in accordance with the NFS protocol, the request is termed a remote procedure call (RPC); however the more generic term "request" will be hereafter employed.

Request queue 18 is a first-in/first-out queue, but it will be hereafter understood that requests listed therein can be extracted from any position within the queue, depending upon an assigned priority level.

In order to handle dispatch of requests from client CPU 10 to CPU 14, a number of I/O daemons 20, 22, 24, etc. are provided. Each I/O daemons comprises a procedure which enables dispatch of a request to CPU 14 and the reception of various message structures which enable the request to be fulfilled. Each I/O daemon is only able to handle one request at a time from request queue 18. Thus, the total number of requests which can be handled at any one time is dependent upon the number of I/O daemons that are provided within client CPU 10.

Figure 2:
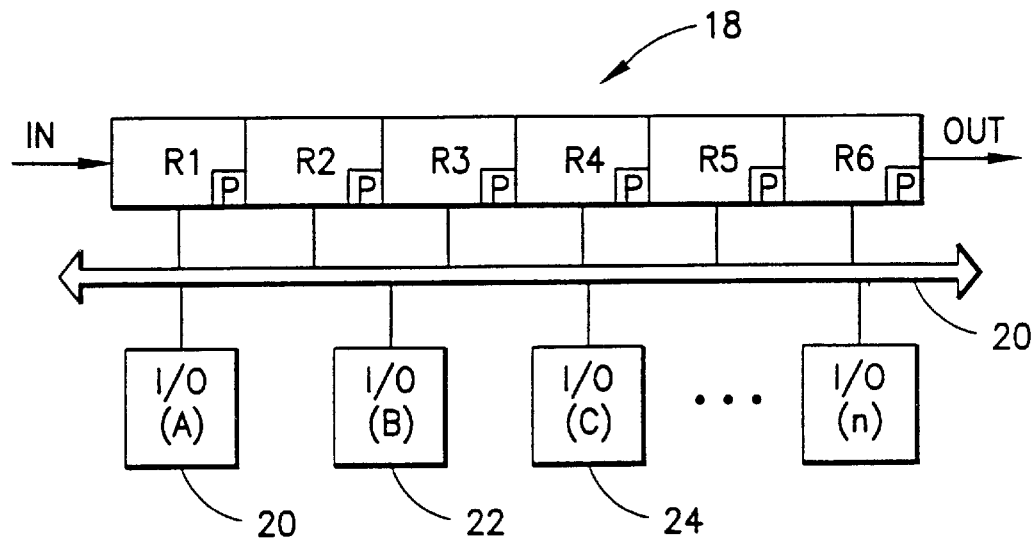
FIG. 2 is a schematic of a request queue and indicates the relationship of various I/O daemons to the request queue.

Referring to FIG. 2, request queue 18 is schematically shown as comprising a plurality of linked requests R1–R6, each of which includes an assigned priority value P. Each stage of request queue 18 is accessible by a bus 20. Each of I/O daemons 20, 22, 24, etc. is also coupled via bus 20 to each of the storage positions within request queue 18. As a result, each I/O daemon is enabled to scan the requests in request queue 18 and to examine the priority of each thereof.

Each I/O daemon is programmed to return a request to the input end of request queue 18, if the I/O daemon has been unsuccessful in attempting dispatch of the request to server procedure 12. Each I/O daemon, as will be hereafter understood, examines the requests queued in request queue 18 and selects the request exhibiting the highest priority level that is closest to the output end of request queue 18. If all requests exhibit the same priority, the I/O daemon selects the request that is positioned at the output end of the queue. Once a request is removed from request queue 18, the remaining requests are pushed down to make room for a next request at the queue's input end.

Figure 3:
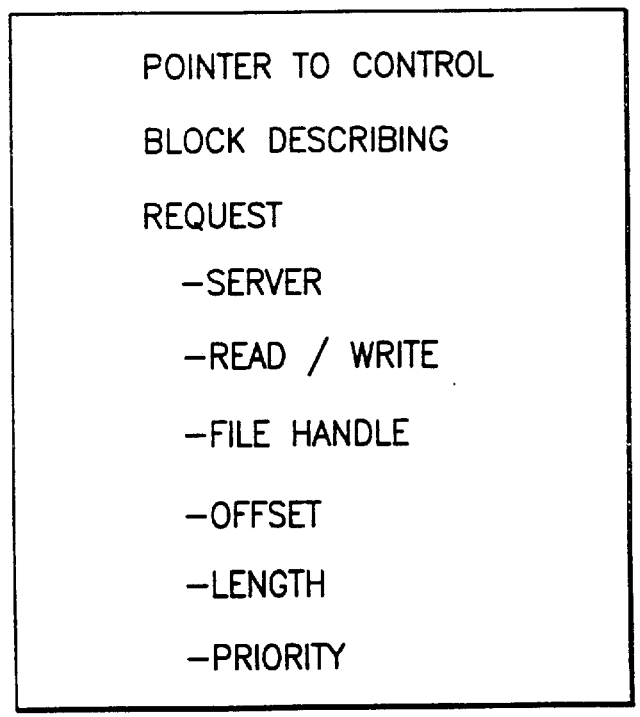
FIG. 3 illustrates the components of a request control block.

FIG. 3 schematically illustrates the contents of a request control block which is dispatched by an I/O daemon to server procedure 12. Those familiar with the NFS protocol will recognize the request control block as essentially including the data necessary to implement a remote procedure call. The data included in a request control block include: a pointer to a further control block which describes the request; the server's identification; whether the request involves a read or write action; the handle of the file that is to be the subject of the request; the offset and length of the data within the file that is to be accessed; and the priority of the request. The request control block also includes message type indicator which represents a priority value. This invention utilizes that field of the request control block as the position for placement of a priority value that is assigned to the request.

Figure 4:
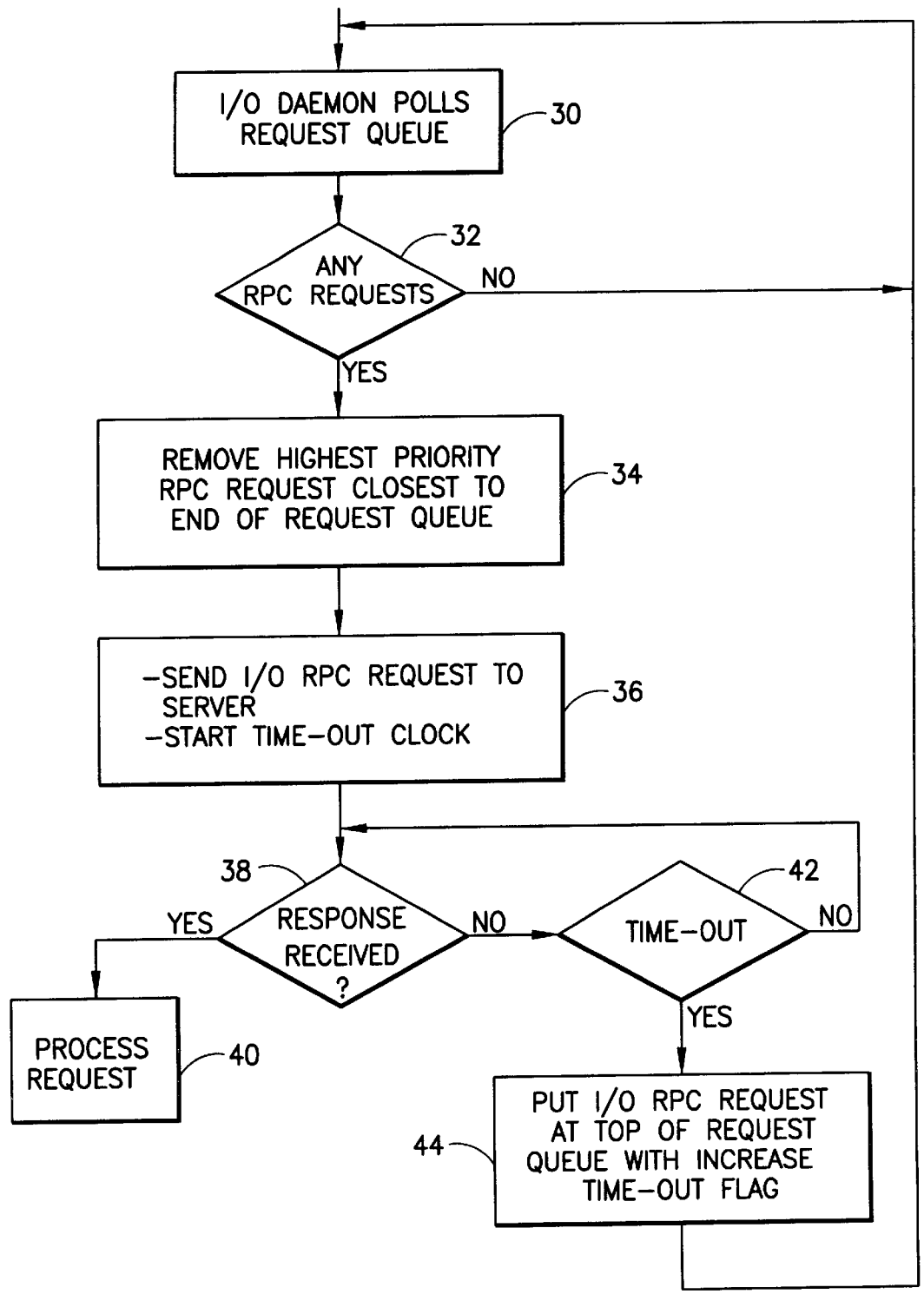
FIG. 4 is a high level flow diagram illustrating the method of the invention.

Turning now to FIG. 4, the procedure followed by the invention will be described. Each I/O daemon that is unoccupied, polls request queue 18 (box 30). If there are no RPC requests present on request queue 18, the procedure recycles (decision box 32). If an RPC request is present on request queue 18, the I/O daemon removes the highest priority RPC request that is closest to the end of request queue 18 (box 34). At such time, other requests present on request queue 18 are pushed down to make room for an additional request to be placed thereon.

The I/O daemon then sends an RPC to server procedure 12 and starts a time-out clock (box 36). If a response is received (decision box 38) prior to the expiration of the time-out clock, the I/O daemon then processes the request (box 40) in normal fashion and continues by transmitting necessary messages to server procedure 12 to enable accomplishment of the read/write action. By contrast, if a response has not yet been received (decision box 38) and the time-out clock has not expired, nothing changes. If, however, the time-out clock expires (decision box 42), then the RPC request is placed at the top of request queue 18, thereby freeing the I/O daemon to again poll request queue 18 in search of another RPC request to service.

When the current RPC request is placed back at the top of request queue 18, an "increase" time-out flag is appended thereto which causes an increase in the time-out period during the next dispatch attempt. The increase in the time-out period accommodates the problem that server CPU 14 was not able to respond to the previous RPC dispatch as a result of network congestion. The increased time-out period thereby enables a longer period during which the request can be acknowledged by CPU 14. It is to be understood that the increase in the time-out threshold may occur once or twice, but thereafter, is maintained at a constant value until the request is accommodated.

As a result of the procedure illustrated in FIG. 4, a limited number of I/O daemons are able to handle large numbers of RPC requests. Further, because each I/O daemon is able to terminate its action in the event of a time-out, before a response is received, the I/O daemon is thereby released to handle other requests that are present in the request queue. Finally, the provision of priority values in each request also enables the highest priority requests to be handled first, irrespective of their position on the request queue, vis a vis other lower priority pending requests.

It should be understood that the foregoing description is only illustrative of the invention. Various alternatives and modifications can be devised by those skilled in the art without departing from the invention. For instance, the procedure described above can be operated by a data processing system in accordance with program data and instructions read from a magnetic memory disk or other memory media. More specifically, a disk or set of disks can enable the data processing system to carry out the functions of the invention. Accordingly, the present invention is intended to embrace all such alternatives, modifications and variances which fall within the scope of the appended claims.

We claim:

1. In a computer system including at least a server procedure and a client processor, said client processor comprising:

application means for issuing requests for execution of a server procedure;

queue means for listing said requests in a queue having a beginning and an end;

plural I/O procedure means, each I/O procedure means for enabling dispatch of a request to a server procedure;

processor means, operating in conjunction with an I/O procedure means, for removing a request from any position within said queue means in accord with a determined protocol and dispatching said request to said server procedure, said processor means responsive to occurrence of a time-out with no response having been received from said server procedure to said request, to place said request at the beginning of said queue means so as to enable said I/O procedure means to service a further request from a position within said queue means in accord with said determined protocol.

2. The computer system as recited in claim 1, wherein each said request is assigned a priority level, and said processor means responds to said determined protocol by first removing a request from said queue means which evidences a highest assigned priority level, before removing a request from said queue means which evidences a lower priority.

3. The computer system as recited in claim 1, wherein said processor means, upon occurrence of a time-out in relation to a specific request, associates an increased time-out flag with said specific request so that when said specific request is again dispatched from said queue means, that in an event of no response from said server procedure, an increased time-out is allowed to occur before said processor means re-places said specific request on said queue means.

4. The computer system as recited in claim 1, wherein said processor means responds to said determined protocol by removing said further request from the end of said queue means.

5. The computer system as recited in claim 1, wherein each said plural I/O procedure means only operates on a request that has been removed from said queue means, so that when a request is returned to said queue means, an I/O procedure means that was operating thereon is freed to operate upon another request from said queue means.

6. A method for enabling a computer system to handle requests for a server procedure which are issued from a client processor, said method comprising the steps of:

issuing requests from an application on said client processor for execution of server procedures;

listing said requests in a queue having a beginning and an end;

employing an I/O procedure to enable dispatch of a request to a server procedure, said I/O procedure removing a request from any of plural positions within said queue and dispatching said request to said server procedure, said I/O procedure responsive to occurrence of a time-out with no response having been received from said server procedure to said request, to place said request at the beginning of said queue so as to free said I/O procedure to service a further request from a position within said queue.

7. The method as recited in claim 6, wherein each said request is assigned a priority level, said I/O procedure first removing a request from said queue which evidences a highest assigned priority level, before removing a request from said queue which evidences a lower priority.

8. The method as recited in claim 6, wherein said I/O procedure, upon occurrence of a time-out in relation to a specific request, associates an extended time-out indicator with said specific request so that when said specific request is again dispatched from said queue, that in an event of no response from said server procedure, an extended time-out is allowed to occur before said I/O procedure replaces said specific request on said queue.

9. The method as recited in claim 6, wherein said I/O procedure removes said further request from the end of said queue.

10. The method as recited in claim 6, wherein each said plural I/O procedure only operates on a request that has been removed from said queue, so that when a request is returned to said queue, an I/O procedure that was operating thereon is freed to operate upon another request from said queue.

11. A memory media for operation in conjunction with a computer system to enable said computer system to handle requests for a server procedure issued from a client processor, said memory media comprising:

first means for controlling said client processor to issue requests, from an application running on said client processor, for execution of server procedures;

second means for causing said client processor to list said requests in a queue having a beginning and an end;

third means for causing said client processor to employ an I/O procedure to enable dispatch of a request to a server procedure, said I/O procedure removing a request from any of plural positions within said queue and dispatching said request to said server procedure, said I/O procedure responsive to occurrence of a time-out with no response having been received from said server procedure to said request, to place said request at the beginning of said queue so as to free said I/O procedure to service a further request from a position within said queue.

12. The memory media as recited in claim 11, wherein said second means assigns each said request a priority level, and said third means causes said I/O procedure to first remove a request from said queue which evidences a highest assigned priority level, before removing a request from said queue which evidences a lower priority.

13. The memory media as recited in claim 11, wherein said third means causes said I/O procedure, upon occurrence of a time-out in relation to a specific request, to associate an extended time-out indicator with said specific request so that when said specific request is again dispatched from said queue, that in an event of no response from said server procedure, an extended timeout is allowed to occur before said I/O procedure replaces said specific request on said queue.

14. The memory media as recited in claim 11, wherein said third means causes said I/O procedure to remove said further request from the end of said queue.

15. The memory media as recited in claim 11, wherein said third means causes each said plural I/O procedure to operate only on a request that has been removed from said queue, so that when a request is returned to said queue, an I/O procedure that was operating thereon is freed to operate upon another request from said queue.

* * * * *